US006197148B1

(12) United States Patent
Deprez et al.

(10) Patent No.: US 6,197,148 B1
(45) Date of Patent: Mar. 6, 2001

(54) WEB MATERIAL HAVING SPLICED JOINTS AND A METHOD FOR COATING A WEB MATERIAL HAVING SPLICED JOINTS

(75) Inventors: Robert J. Deprez, Avon; James M. Breitfeller, Rochester, both of NY (US)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 09/283,066

(22) Filed: Mar. 31, 1999

(51) Int. Cl.[7] .................................. B32B 7/12; B31F 5/06
(52) U.S. Cl. .................................... 156/304.3; 156/305.5; 156/278; 427/299; 428/61
(58) Field of Search ................................ 156/157, 304.1, 156/304.3, 304.5, 278, 280; 428/61; 427/299, 420

(56) References Cited

U.S. PATENT DOCUMENTS 3,518,141 * 6/1970 Bourns et al. ........................ 156/157
3,531,362 9/1970 Bourns et al. .
3,972,762 * 8/1976 Kawahara et al. ............... 156/280 X
4,024,302 5/1977 Takagi et al. .
4,172,001 * 10/1979 Heetderks ............................ 156/157
4,269,647 5/1981 Verkinderen et al. .

* cited by examiner

*Primary Examiner*—Mark A. Osele
(74) *Attorney, Agent, or Firm*—Thomas H. Close

(57) ABSTRACT

A web material, which is able to avoid air entrainment, comprises a surface for applying at least one layer of coating material. The web material has at least one splicing tape for connecting a preceding web and a succeeding web with respect to a transport direction of the web material. The splicing tape defines a trailing edge on the surface of the succeeding web. After the trailing edge of the splicing tape a thin layer with limited width and a rough surface is formed. Additionally, there is a method for continuous coating a web material having at least one spliced joint. The method comprises the steps of: applying a splicing tape on one surface of a preceding web and succeeding web, with respect to a transport direction of the web material, and thereby connecting said preceding web and said succeeding web; providing an additional layer with limited width and thereby defining a rough surface on the surface of the succeeding web immediately after the splicing tape; and applying at least one layer of continuous coating to the surface of the web material.

7 Claims, 12 Drawing Sheets

WEB MATERIAL HAVING SPLICED JOINTS AND A METHOD FOR COATING A WEB MATERIAL HAVING SPLICED JOINTS

FIELD OF THE INVENTION

This invention relates to the field of coating of webs having spliced joints. More specifically the invention relates to a method for the continuous coating of a moving web containing discontinuities in its surface such as those arising from the splicing of one roll of base material to another by the use of adhesive tape or the like. Additionally the invention relates to a web material with spliced joints wherein at least one layer of coating material can be applied without causing discontinuities in the moving web.

BACKGROUND OF THE INVENTION

The manufacture of items such as photographic films and papers requires the substantially continuous coating of aqueous solutions or dispersions of hydrophilic colloids or similar materials. The substrates onto which the solutions are coated are typically supplied to the coating operation as discrete units, usually referred to as "rolls" of base material or "webs". In order for the coating operation to be substantially continuous, the rolls of base material are joined together (spliced) prior to coating. This splicing operation often results in a discontinuity in the surface to be coated. This discontinuity is often in the form of a piece of adhesive tape or similar material (henceforth referred to as a "splice") used to join the end of one roll of support to the beginning of another. This splice often causes non-uniformity in the coating.

A specific cause of coating non-uniformity due to the splice is the air that is entrained between the coating and the substrate at the trailing edge of the splice as shown in FIG. 1. A plurality of discrete webs 2 and 4, each having a leading edge 6 and a trailing edge 8 with respect to a transport direction T, are connected to form an almost endless web for coating. The trailing edge 8 of the preceding web 2 is connected lengthwise with leading edge 6 of a succeeding web 4 using a splicing tape 10. In the description below the expression "web material" stands for the plurality of webs, which are connected by the splicing tape 10 (see FIG. 1). A coating 12 is applied on top of the transported web material and as the coating 12 passes over a trailing edge 14 of the splicing tape 10, it cannot instantaneously regain contact with the surface 15 of the succeeding web 4. An air layer 16 is entrained between the coating 12 and the surface 15 of the succeeding web 4. The presence of this air layer 16 results in such defects as bubbles and streaks (not shown), the severity of which increase with the length of time necessary for the coating to regain contact with the surface 15 of the succeeding web 4. These bubbles and streaks result in areas of non-uniformity in the coating thickness which make the product unsuitable for sale. Additionally, areas of the web with thicker-than-desired coating will not dry in the same period of time as the uniform portions of the coating 12, requiring an increase in drying capacity to accommodate the thicker area of coating. If drying is not sufficient for the overly thick areas of the coating, contamination of the apparatus occurs, resulting in additional waste and curtailment of production for cleaning. It is therefore highly advantageous to limit the severity and duration of this air entrainment.

An additional problem associated with extended entrainment of air between the coating 12 and the surface 15 of the succeeding web 4 is illustrated in FIG. 2. The two successive webs 2 and 4 spliced together by the splicing tape 10 are supported by a coating roller 16 and coated by means of an applicator 18. As the splice between the two webs 2 and 4 passes through the coating 12 such that air is entrained on the trailing edge of the splice, the coating 12 momentarily loses contact with the surface to be coated. If this condition is allowed to persist, the portion of the coating between the web and the coating applicator 18 lacks the constraint normally provided by the surface of the web. This allows considerable movement within the liquid such that intermittent contact can be made with the applicator 18 in a region 20 adjacent to the location that the coating 12 normally leaves contact with the applicator 18. This intermittent contact can result in the formation of drips or bubbles that will result in a streak in the applied coating 12. This streak can continue for an extended period of time, long past the duration of the original entrainment of air at the splice. Some type of intervention requiring a cessation of coating is normally required to remedy this condition. The resulting waste can be many times greater than that caused by the initial coating disturbance. As such, it is highly desirable to limit the factors which can cause this condition.

Many methods and arrangements have been suggested to prevent the above described coating non-uniformities and resulting problems. Included among these methods or arrangements is the use of splice tape with a tapered trailing edge, treatment of the area immediately following the trailing edge of the splice with a hydrophobic liquid, and the mechanical deformation or coarsening of the web surface.

U.S. Pat. No. 3,531,362 by Boums et al. suggests the use of splice tape with a tapered trailing edge. This is often impractical given the thickness and shape of the tape used for splicing. The tape is often made up of a polymeric or paper substrate with a thickness of approximately 0.001 to 0.002 inches coated with an adhesive of similar thickness. In order to provide true relief from the entrained air condition, both the tape substrate and the tape adhesive would need to have the tapered profile described in the patent. This is extremely difficult to attain and control on an ongoing basis, and is thus impractical in the manufacture of many coated products, especially those associated with the photographic industry.

U.S. Pat. No. 3,531,362 and U.S. Pat. No. 4,269,647 by Verkinderen et al. suggest the use of a fast-drying hydrophobic liquid to reduce the occurrence and severity of splice induced coating non-uniformities. In the first case, the liquid is applied by means of a felt-tipped pen or similar device to the area immediately following the trailing edge of the splice tape. In the second case, it is suggested that application of a similar liquid by means of a felt-tipped marker or spray device is more useful if the splice tape is on the side of the web opposite that which is to be coated. It is very likely that these liquids did, in fact, reduce the non-uniformity in the coatings. The improvement achieved seems to be due to the hydrophobic nature of the coating on the web material.

U.S. Pat. No. 4,024,302 by Takagi et al. suggests mechanically deforming or coarsening the surface of the substrate in the area immediately following the trailing edge of the splice. This is achieved by such means as knurling, embossing, or sanding the surface of the substrate. The roughness so induced reduces the non-uniformity seen in the coating in much the same way as the present invention. It is important to note that it is not necessary to make the surface to be coated hydrophobic in order for the mechanism to work. The disadvantage of this method is that the mechanically deforming of the surface generates debris on the surface of the substrate to be coated. While it may be possible to remove much of this debris, it represents a considerable and undesirable source of contamination in the process. This is especially undesirable in such applications as the photographic industry, as even a small amount of contamination will result in waste. Loose debris is particularly troublesome in that it can easily spread throughout the process, resulting in considerable amounts of contaminated product.

SUMMARY OF THE INVENTION

It is the object of the present invention to provide a defect-free web material thereby overcoming coating non-uniformities associated with discontinuous areas of the substrate such as splices. The object above is accomplished by a web material comprising at least a succeeding web and at least a preceding web having a surface for applying at least one layer of coating material; at least one splicing tape for connecting said preceding web and said succeeding web with respect to a transport direction of the web material, said splicing tape defines a trailing edge on the surface of the succeeding web; and a thin layer with limited width and a rough surface, is formed on the surface of the succeeding web immediately after the trailing edge of the splicing tape.

Another object of the present invention is to provide a method which overcomes coating non-uniformities associated with discontinuous areas of the substrate such as splices. Furthermore, the apparatus carrying out the coating of the web, should be simple. The object above is accomplished by a method, which comprises the steps of:

applying a splicing tape on one surface of a preceding web and succeeding web, with respect to a transport direction of the web material, and thereby connecting said preceding web and said succeeding web;

providing an additional layer with limited width and thereby defining a rough surface on the surface of the succeeding web immediately after the splicing tape; and applying at least one layer of continuous coating to the surface of the web material.

An advantage of the present invention is that coating defects as a result from the intermittent wetting of surfaces of the coating applicator as a result of disturbances in the process triggered by the above-described discontinuities do not take place. Furthermore, there is no need to do a special and thorough cleaning of the web, since the invention does not leave any contamination on the web or the apparatus which may cause the described coating difficulties. Additionally, the splice does not cause coating defects downstream of the spliced joint. Thereby a uniform thick and bubble- or streak-free coating exists downstream of the spliced joint. This again results in an economical drying step because the uniform thick coating does not require a complicated set up of the drying device. There is no need to adjust the drying energy to a coating of varying thickness. During the coating of the web material, the trailing edge of a discontinuity such as a splice causes air to be entrained between the coating and the substrate surface. The longer the condition of the discontinuity persists, the greater the incidence of coating non-uniformities and associated defects in the coated product. The surface area of the web material on the succeeding web, immediately following the trailing edge of the splice, is covered with a fast-drying liquid containing particles which are organized in the dried layer in a way that they provide an appropriate surface roughness to avoid an entrainment between the web material and the applied layers of coating material. The dried layer has the ability to disturb the layer of air entrained between the coating and the surface of the dried layer. This allows the coating to regain contact with the surface of the substrate more quickly than in the case of a discontinuity that is not so treated. In the case of a splice in the web material, the fast-drying liquid is applied to the surface of the web material before or after the splicing tape is applied, as long as the treated area extends to the area immediately following the trailing edge of the splicing tape. The liquid can be applied under the splicing tape or on top of the splicing tape so long as it extends to the area immediately following the trailing edge of the splicing tape. The liquid is often applied by such means as a felt-tipped marking pen, but can also be sprayed or painted on the substrate.

BRIEF DESCRIPTION OF THE DRAWINGS

The subject matter of the invention is described with reference to the embodiments shown in the drawings.

DETAILED DESCRIPTION OF THE INVENTION

Figure 1:
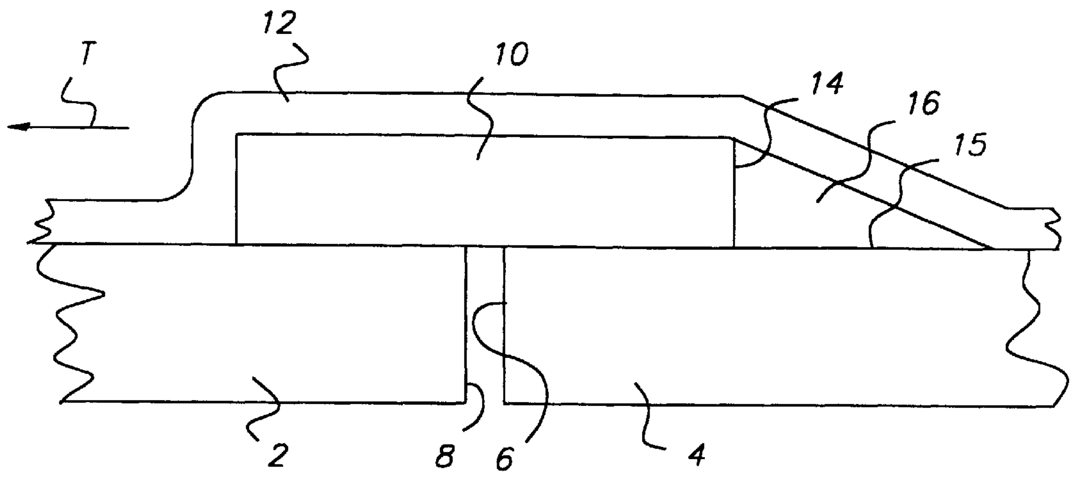
(PRIOR ART) FIG. 1
FIG. 1 is a greatly enlarged schematic section through a splice coated according to a prior art arrangement.
Figure 3:
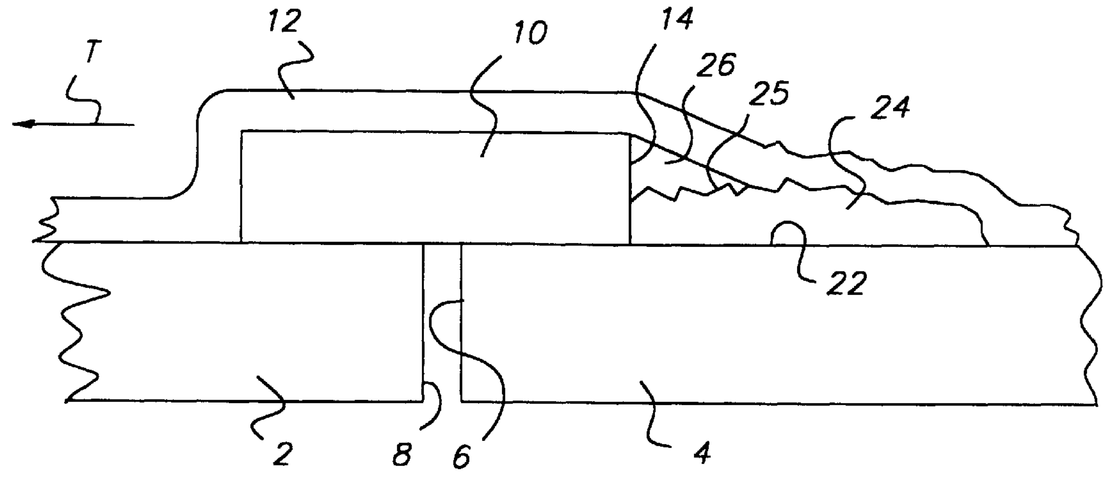
FIG. 3 is a greatly enlarged schematic section through a splice coated using a preferred embodiment of the present invention.

FIG. 3 shows one embodiment of this invention. Elements, which are similar to the coating arrangement as disclosed in the prior art, are indicated with the same reference numeral. The trailing edge 8 of the preceding web 2 is connected lengthwise with the leading edge 6 of a succeeding web 4 using a splicing tape 10. A surface area 22 of the succeeding web 4, which immediately follows the trailing edge 14 of the splicing tape 10, is covered with a thin layer 24 defining a rough surface 25. The thin layer 24 is applied to the surface 22 of the succeeding web 4 with a fast-drying liquid, which contains particles of the desired size. As mentioned earlier, the fast drying liquid may be supplied before the application of the splicing tape. It is also possible that the liquid is applied on top of the splicing tape 10, connecting the preceding and the succeeding web 2 and 4, as long as it extends to the surface area 22 of the succeeding web. The application of the liquid is done by means of a felt-tipped marking pen, although other equivalent means such as a spray or paint application are acceptable as well. As the coating 12 passes over the trailing edge 14 of the splicing tape 10, it cannot instantaneously regain contact with the surface of the web. A layer of air 26 is entrained between the coating 12 and the succeeding web 4. According to the invention, the layer of air 26 is entrained between the coating 12 and the surface of the thin layer 24 deposited on the surface area 22 of the succeeding web 4. In this case, however, the portion of the coating disturbed by the entrained air 26 has been greatly reduced by the use of this invention.

Figure 4A:
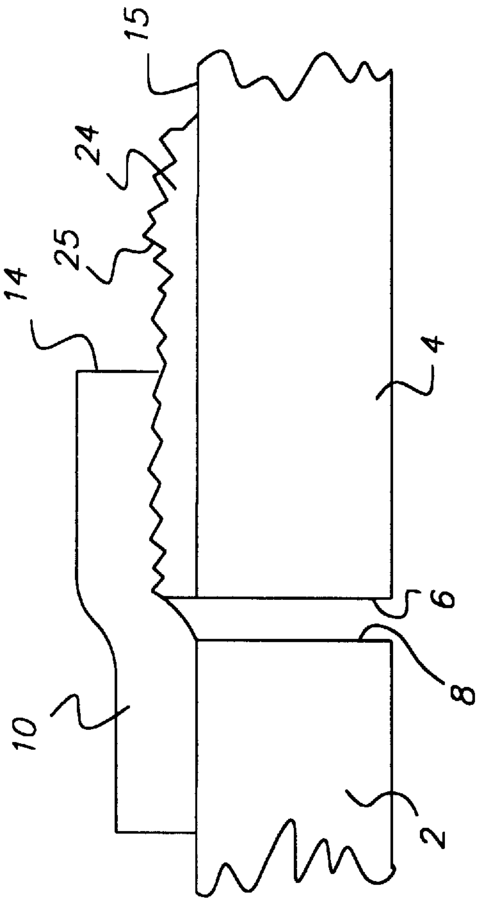
FIG. 4*a* and 4*b* show a first and a second possibility to apply the splicing tape and the additional layer.
Figure 4B:
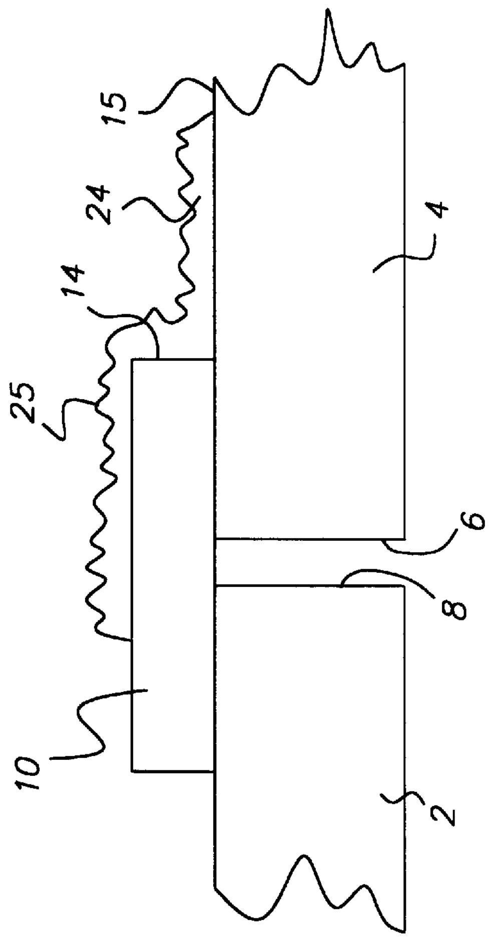

FIG. 4*a* and FIG. 4*b* show two different approaches to apply the splicing tape 10 and the thin layer 24. In FIG. 4*a* the thin layer 24 with the rough surface is applied to the surface of the succeeding web 4 immediately after the preceding edge 6 of the succeeding web 4. The splicing tape 10 connects the preceding web 2 and the succeeding web 4. A part of the surface of the thin layer 24 immediately following the leading edge 6 of the succeeding web 4 is covered by the splicing tape 10. Enough free surface 25 of the thin layer 24 is left after the trailing edge 14 of the splicing tape 10 to achieve the desired effect of the present invention. In FIG. 4*b* the splicing tape 24 is applied to the surface of the proceeding web 2 and the succeeding web 4. The thin layer 24 with the rough surface is applied on top of the splicing tape 10 and to the surface 15 of the succeeding web 4. Consequently, a portion of the thin layer is covering the surface 15 of the succeeding web 4. The portion is large enough to break up the air entrainment within the width of the thin layer 24 covering the surface 15 of the succeeding web 4.

In principle there are two embodiments to carry out the method of coating the web-material with the spliced joints. The method is carried out with a coating apparatus well known in the art. In the first embodiment the preceding web 2 and the succeeding web 4 are connected by the application of a piece of splicing tape 10. The splicing tape 10 covers thereby a portion of the trailing edge area of the preceding web 2 as well as a portion of the leading edge area of the succeeding web 4. The thin layer 10, which defines a rough surface 25, is applied after the trailing edge 14 of the splicing tape 10. The thin layer 24 has a limited width, which is sufficient to limit any possible air entrainment within the width of the thin layer 24 covering a limited part of the surface 15 of the succeeding web 4. Finally, the continuous coating 12 is applied to the surface of the web material.

In the second embodiment the surface of succeeding web 4 is covered with the thin layer 24 having a limited width. The thin layer 24 covers a limited surface area of the succeeding web 4. The limited surface area begins at the leading edge 6 of the succeeding web 4. The trailing edge 8 of the preceding web 2 and the leading edge 6 of the succeeding web 4 are positioned parallel to each other. The splicing tape 10 is applied and thereby connecting the said preceding web 2 and said succeeding web 4. A portion of the thin layer 24 is left uncovered, thereby exposing the surface 25 of the thin layer 24 after the trailing edge 14 of the splicing tape 10. A continuous coating 12 is then applied to the surface of the web material. In both embodiments the thin layer 24 is applied in liquid form to the surface portion of the succeeding web 4 or even partially to the surface of the splicing tape 10. The liquid is a fast drying liquid. After drying the particles solved in the liquid form the thin layer 24 with the rough surface 25.

Figure 2:
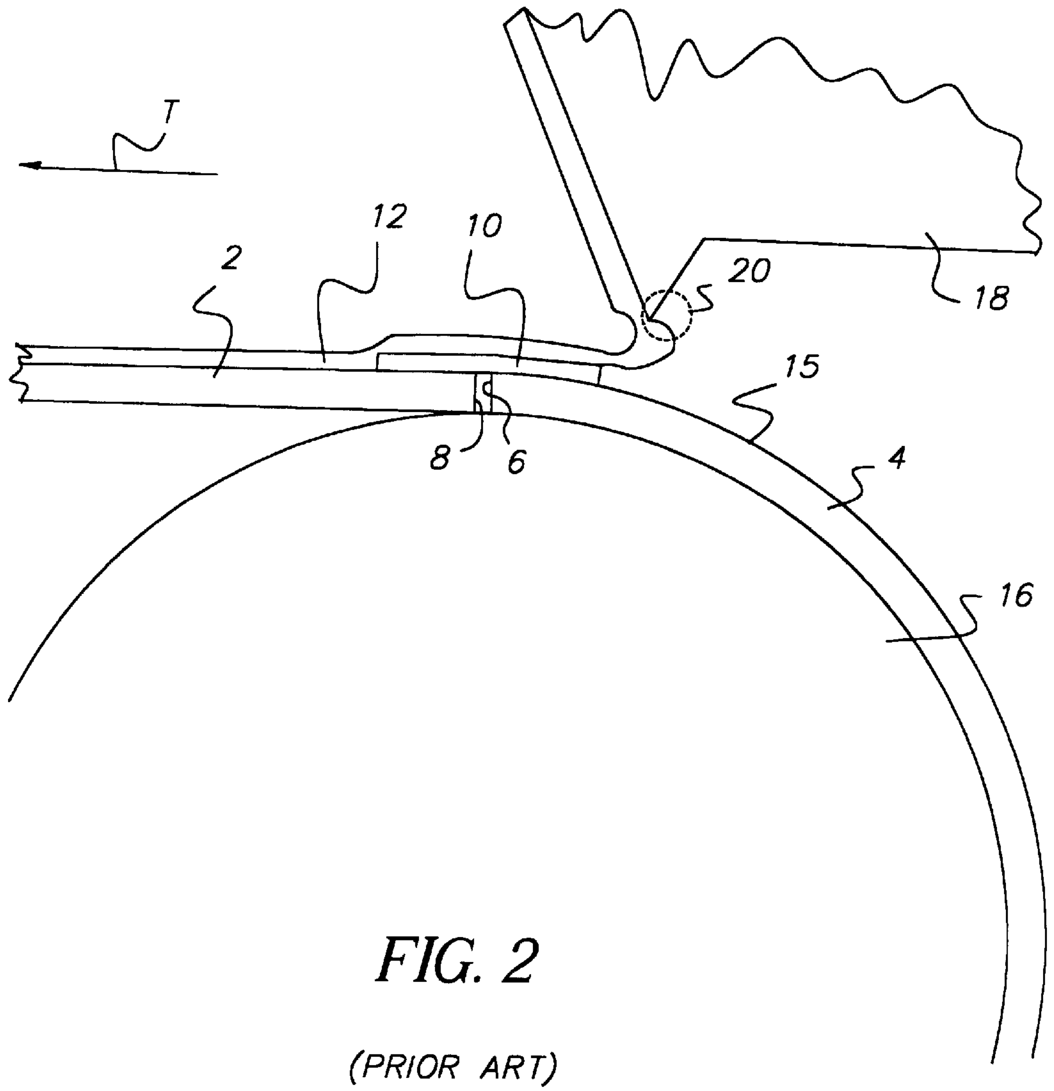
FIG. 2 (PRIOR ART)
FIG. 2 is a greatly enlarged schematic section through a similar splice as shown in FIG. 1 and displaying a mechanism for coating.

The method of this invention also is effective when used in conjunction with other splice coating aids that are known by those skilled in the art. These splice coating aids include changes in the pressure differential applied to the portion of the coating between the applicator 18 and the web material (see FIG. 2). Furthermore, the use of an electrostatic charge supports the application of the coating 12 to the web material. The electrostatic charge is applied at an elevated level in the area containing the spliced joint (splicing tape 10 and thin layer 24).

Figure 5:
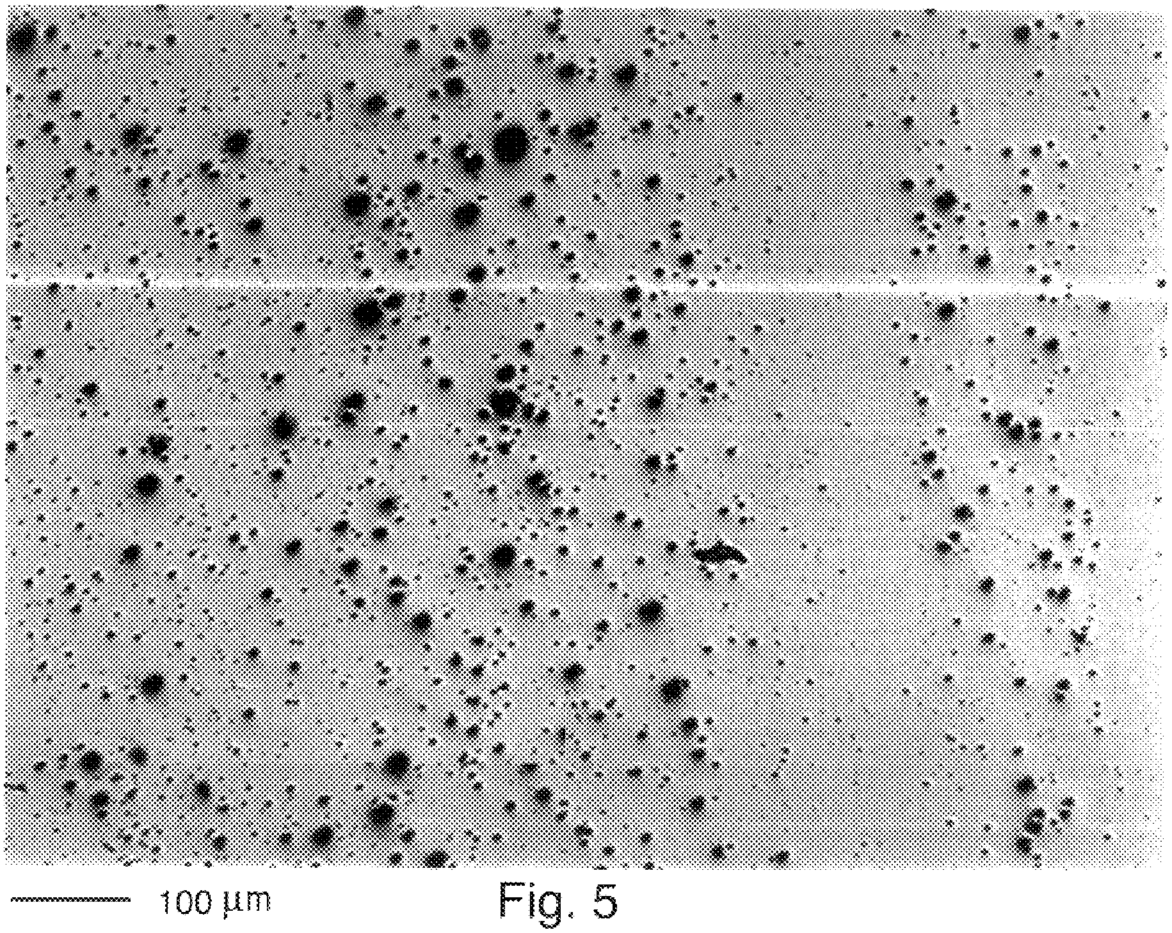
FIG. 5 is an enlargement of an area of the additional thin layer taken by a normal microscope.
Figure 6:
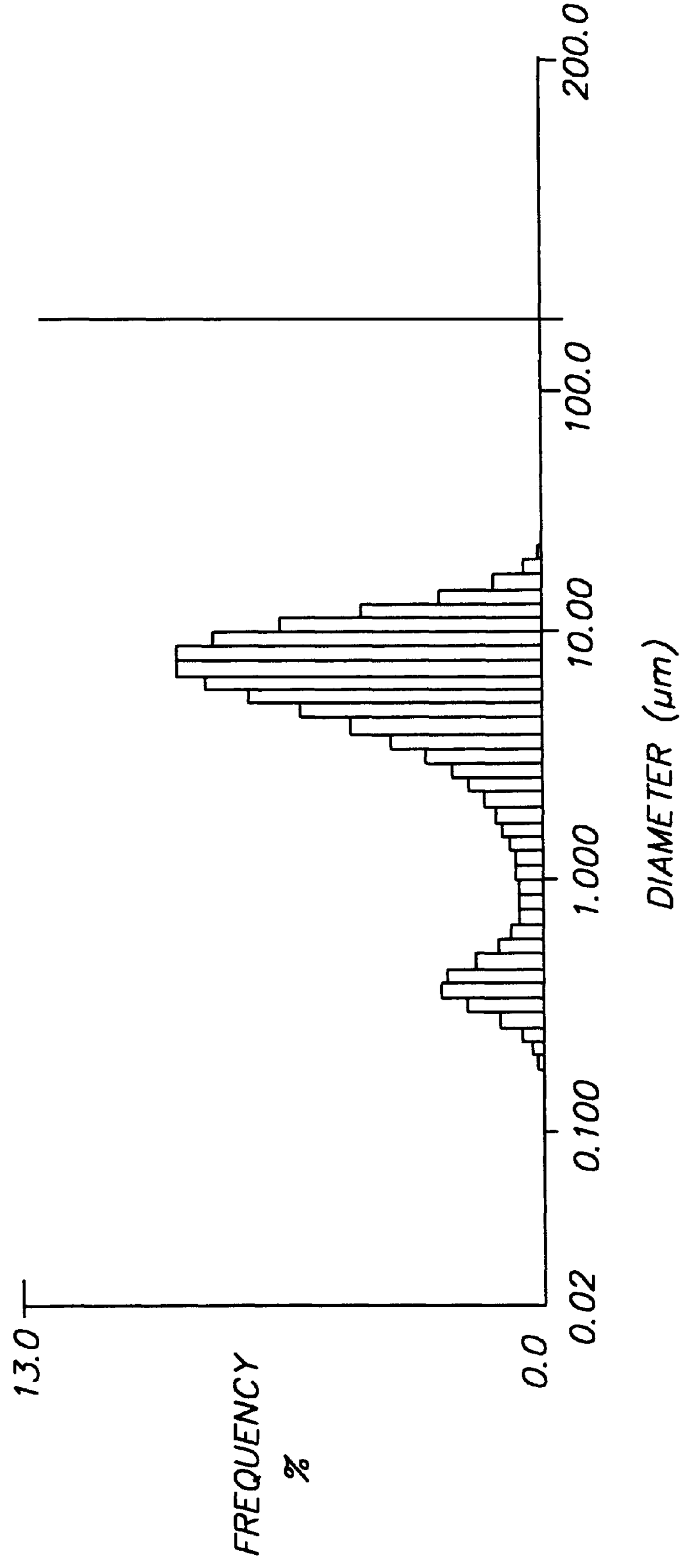
FIG. 6 is a graphical representation of the size distribution of the particles in the fast drying liquid used to generate the layer as shown in FIG. 5.
Figure 7:
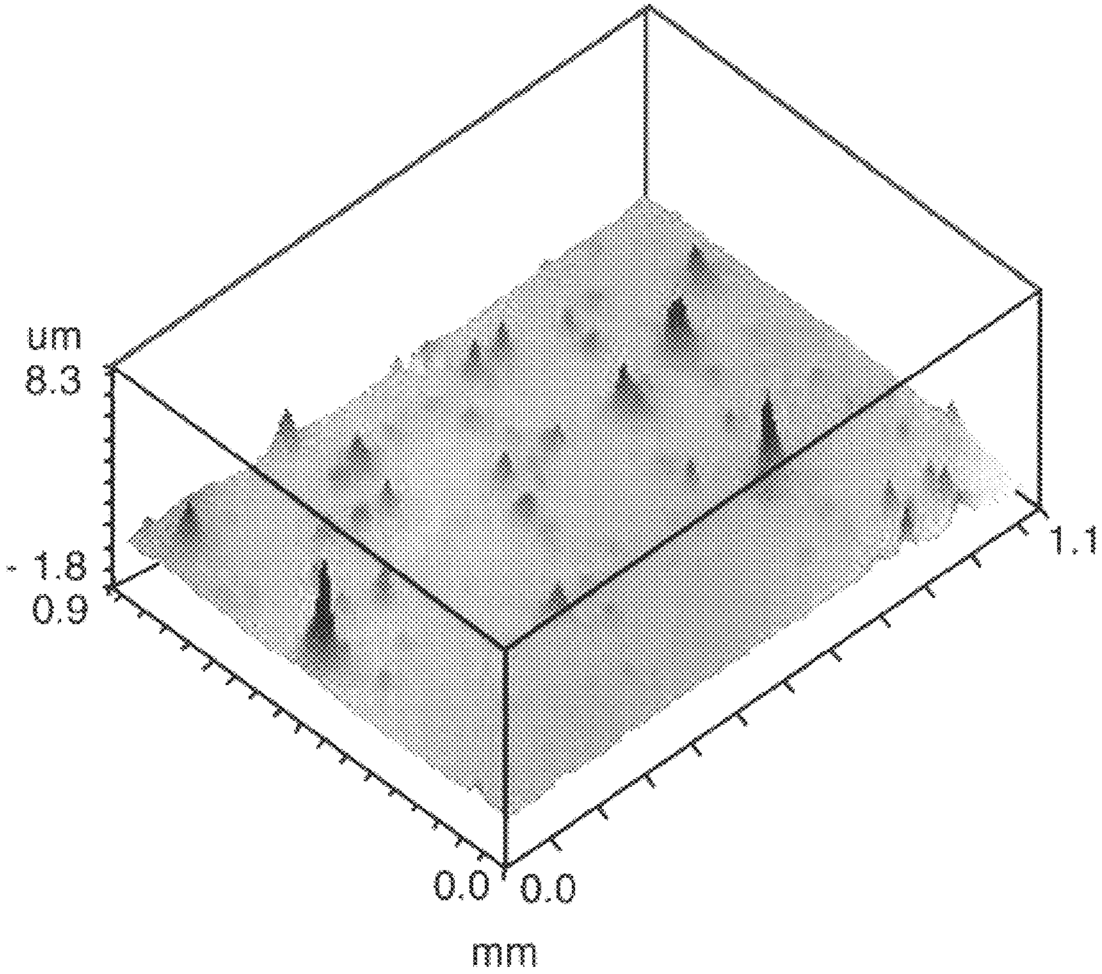
FIG. 7 is a three dimensional view of a surface section of the additional layer of the type as applied in FIG. 5.

FIG. 5 is a microscopic representation of the distribution of the particles on the surface of the thin layer 24. The particles are dissolved in the fast drying liquid. One of numerous possibilities, to apply the liquid together with the dissolved particles, is the use of a felt pen (EDDING 850). The size distribution of the particles is shown in FIG. 6. The distribution is determined by soaking the tip of the marker in an appropriate solvent. According to the light scattered from the solution, the particle-size distribution is determined. The system used for determining and graphically displaying the particle size distribution is a HORIBA LA-920 for Windows™. The process includes a sonification of the samples to break up clumps of the particles to some degree. The sonification makes sure that it is the individual particles to be measured. This system has been used for the determination of the particle size distribution (see also especially FIGS. 9 and 12). The distribution for the EDDING 850™ felt pen reveals that 85% of the particles are bigger than 1 μm. The surface (surface roughness) of the applied additional thin layer was furthermore investigated with a WYKO™ surface analysis technique (results of the surface analysis see FIG. 7, FIG. 10 and FIG. 13). FIG. 7 provides an impression of the surface roughness, which is caused by the application of the fast drying liquid. A surface area of 1146.16 μm×748.8 μm was measured at a sampling rate of 1 .56 μm. As a result one can easily see that there are some sharp spikes sticking out of the surface. The difference between the highest point of the surface and the lowest point is 10.12 μm. This felt pen provides a surface roughness on the web material which effectively prevents air entrainment.

Figure 8:
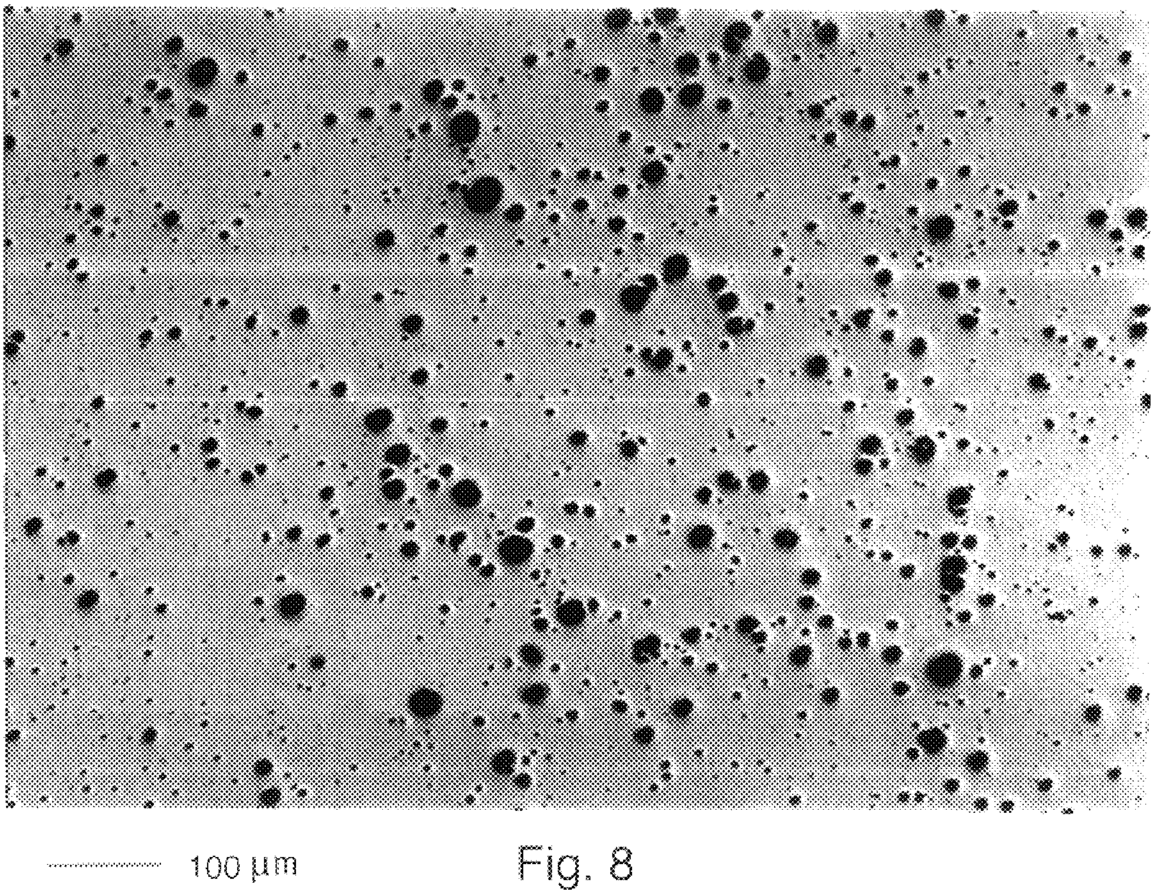
FIG. 8 is an enlargement of an area of the additional thin layer taken by a normal microscope.
Figure 9:
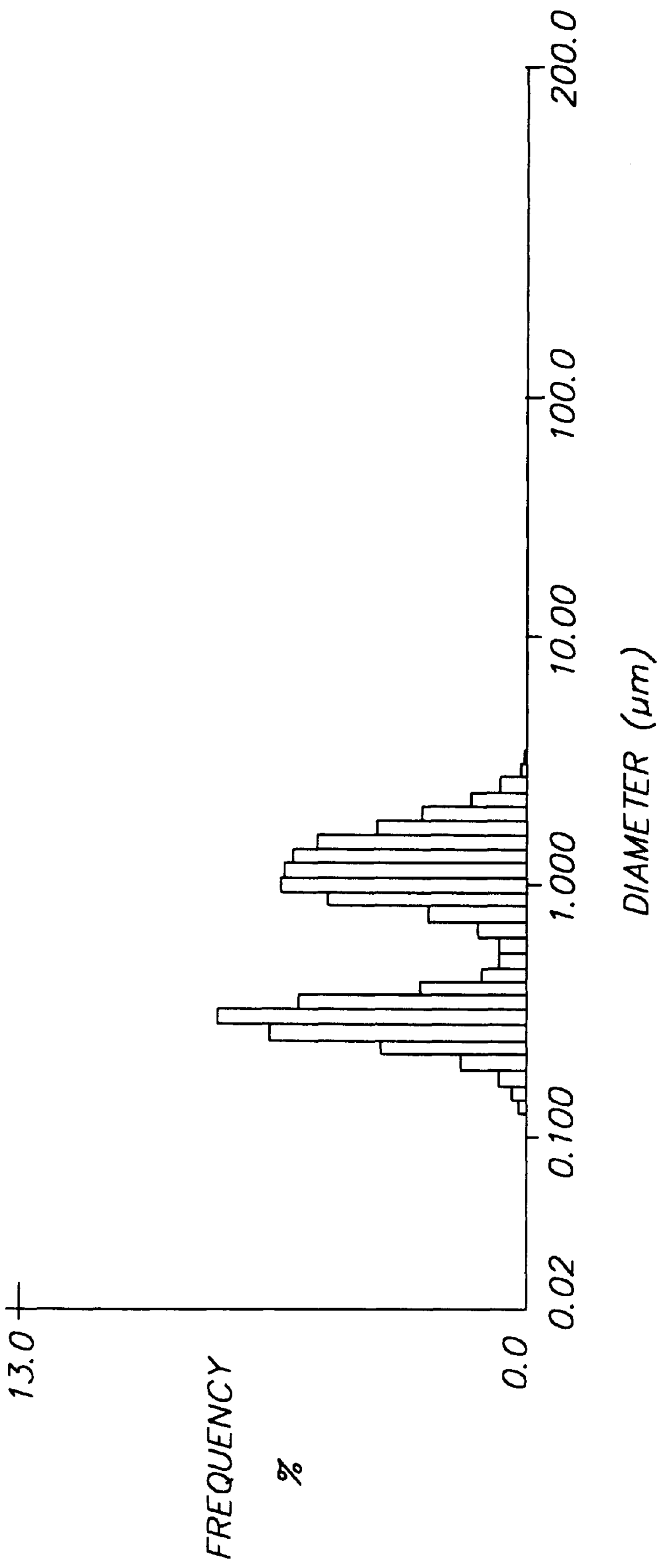
FIG. 9 is a graphical representation of the size distribution of the particles in the fast drying liquid used to generate the layer as shown in FIG. 8.
Figure 10:
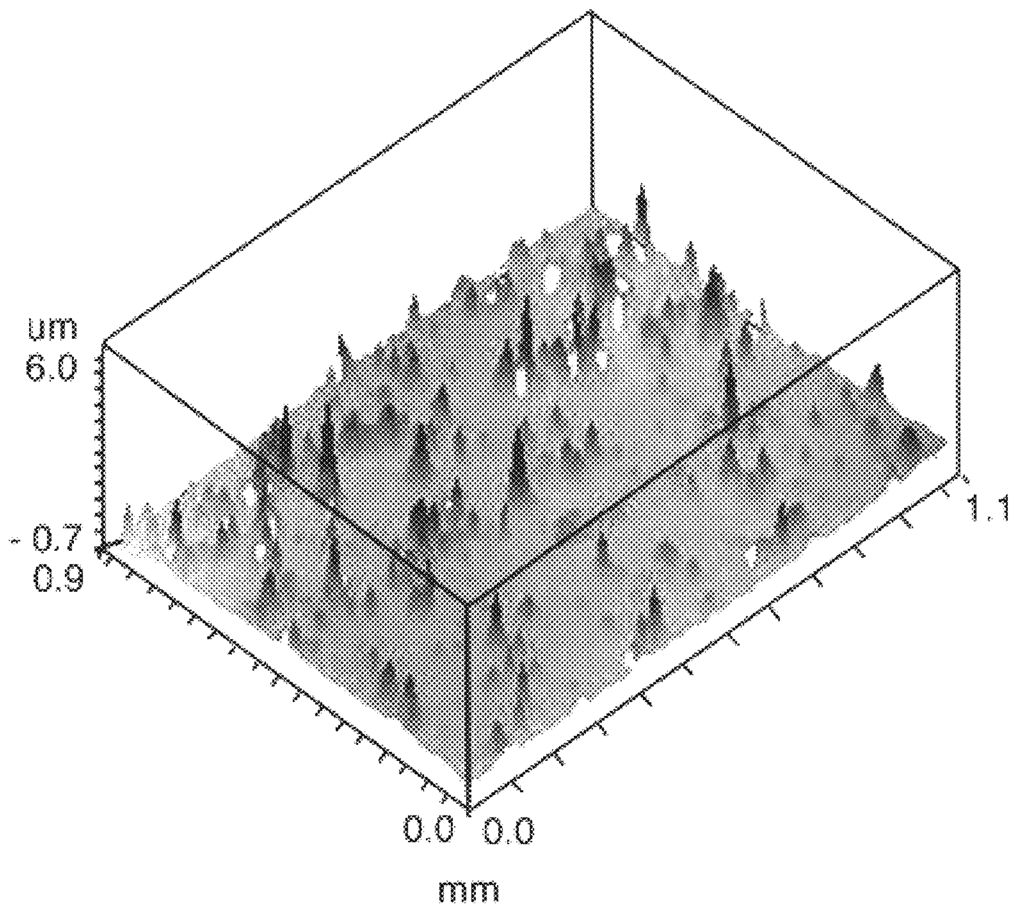
FIG. 10 is a three dimensional view of a surface section of the additional layer of the type as applied in FIG. 8.

FIG. 8 is a microscopic representation of the distribution of the particles on the surface of the thin layer 24, which is also applied by a felt pen. The brand name of the felt pen is MAGNUM™, and the particles are also dissolved in a fast drying liquid. The size distribution of the particles is shown in FIG. 9. The distribution reveals that at least 35% of the particles are bigger than 1 μm. FIG. 10 provides an impression of the surface roughness, which is caused by the application of the MAGNUM™ felt pen. Also a surface area of 1146.16 μm×48.8 μm was measured at a sampling rate of 1.56 μm. As a result one can easily see that there are numerous sharp spikes sticking out of the surface. The difference between the highest point of the surface and the lowest point is 6.62 μm. This felt pen provides a surface roughness on the web material which effectively prevents air entrainment.

Figure 11:
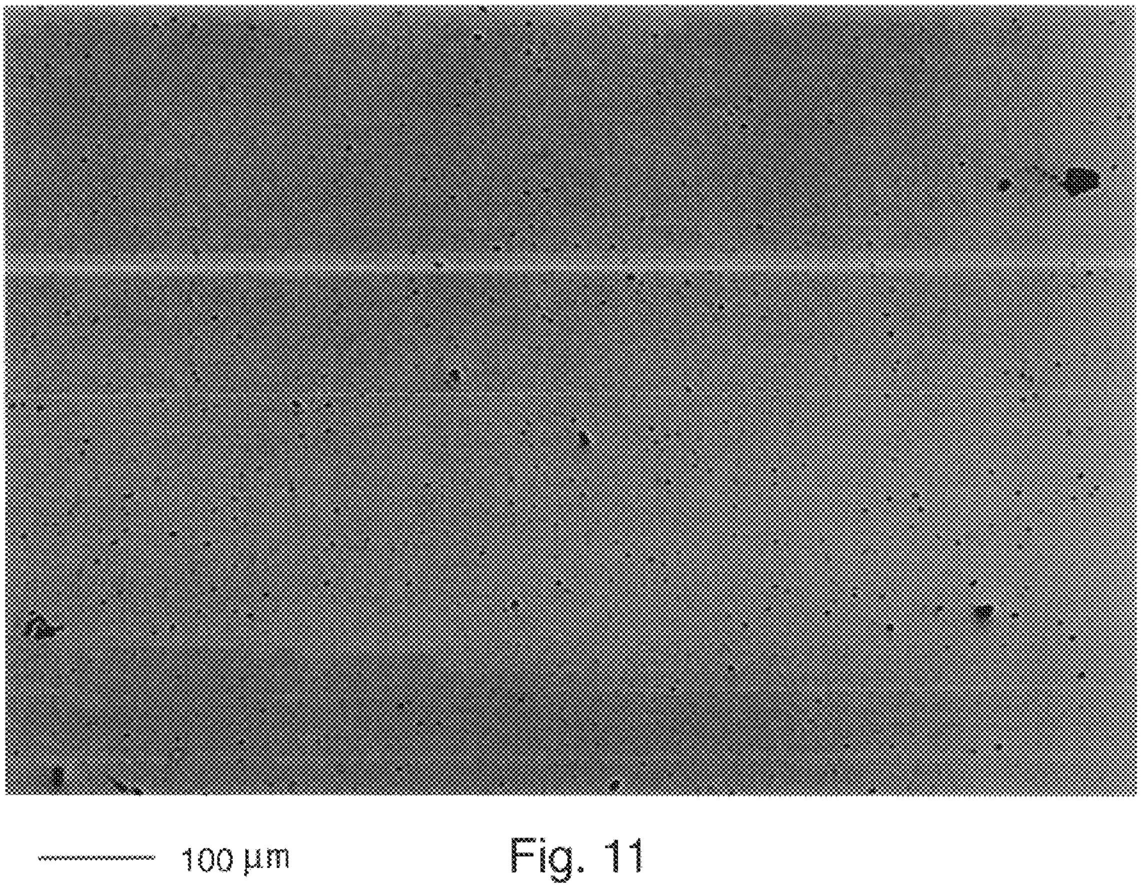
FIG. 11 is an enlargement of an area of the additional layer taken by a normal microscope wherein the surface roughness of the layer is not sufficient to effectively avoid air entrainment.
Figure 12:
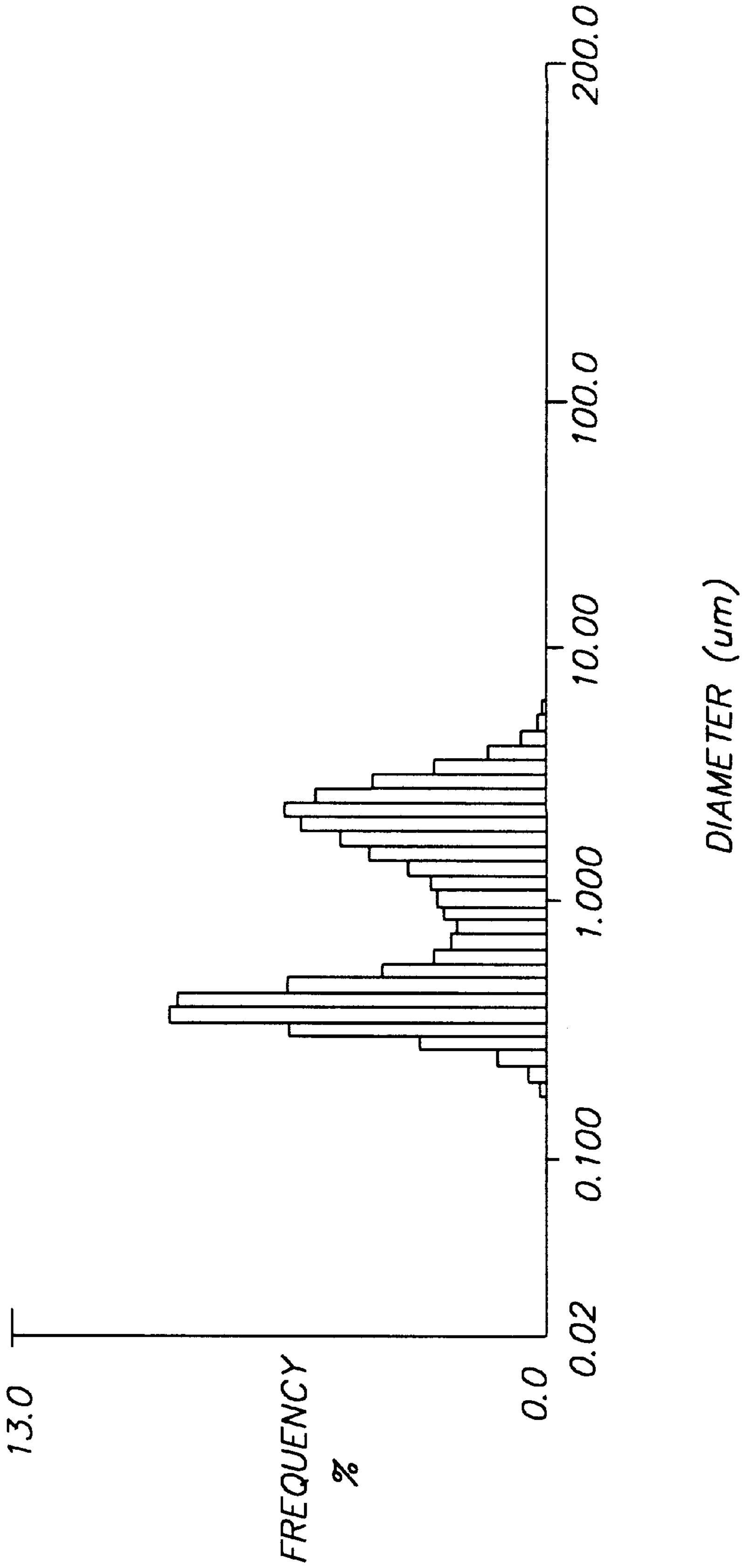
FIG. 12 is a graphical representation of the size distribution of the particles in the fast drying liquid used to generate the layer as shown in FIG. 11.
Figure 13:
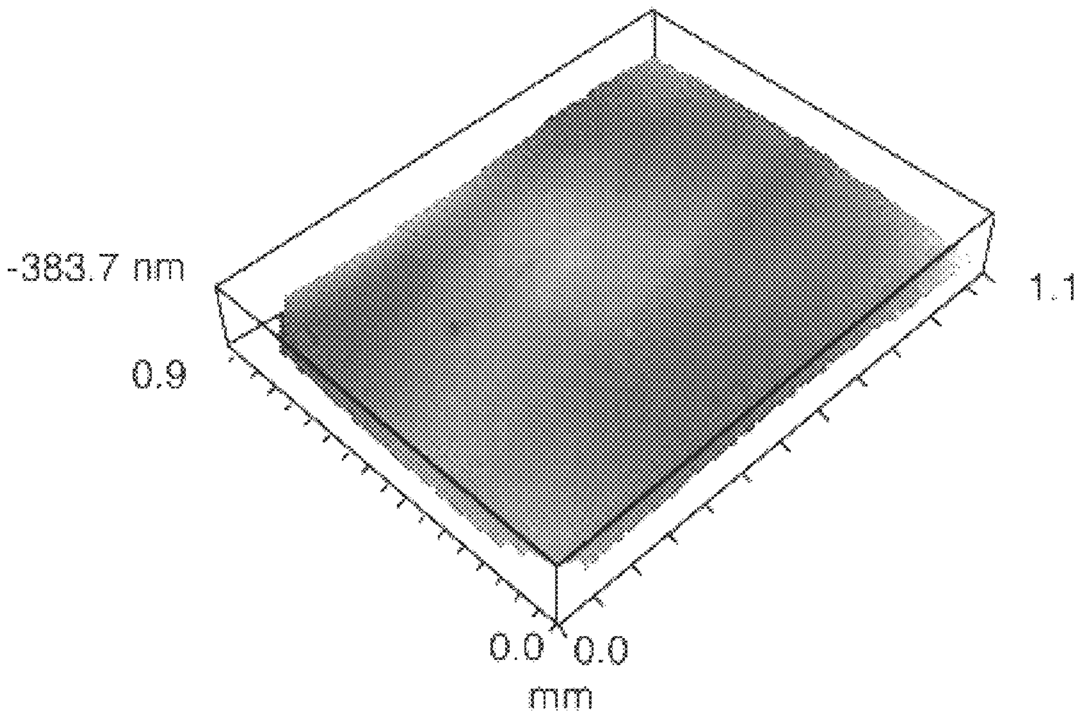
FIG. 13 is a three dimensional view of a surface section of the additional layer of the type as applied in FIG. 5.

FIG. 11 is a microscopic representation of the distribution of the particles on the surface of the thin layer 24, which is applied by a felt pen (EDDING 850™) which is manufactured differently with respect to the felt pen as disclosed in FIG. 5 through FIG. 7. The size distribution of the particles is shown in FIG. 12. The distribution reveals that 50% of the particles are bigger than 1 μm. FIG. 13 provides an impression of the surface roughness, which is caused by the application of the EDDING 850™ (new manufacture process) felt pen. Also a surface area of 1146.16 μm×748.8 μm was measured at a sampling rate of 1.56 μm. As a result one can easily see that the surface here is rather smooth. There are no sharp spikes sticking out of the surface. The resulting difference between the highest point of the surface and the lowest point is 1.05 μm. This felt pen does not provide a surface roughness which can effectively prevent air entrainment between the applied coating and the web material.

The photomicrographs (FIG. 7, FIG. 10, and FIG. 13) gained by the WYKO™ analysis provide the insight to the mechanism that improves coating, as they are made from samples of the additional layer, applied by the felt pen to the film base. Compared to the measurements displayed in FIG. 6, and FIG. 9, there are larger particles or clumps of particles present on the surface of the film base. Clump must be present in the liquid before its application to the web material. The clumps provide the needed surface roughness, which avoids the air entrainment. As shown above (FIG. 6, and FIG. 9) the particles dissolved in the fast drying liquid are themselves not large enough to provide the required surface roughness. The surface roughness is characterized by the difference between the highest point of the surface and the lowest point. It turned out that a surface roughness in the range of about 5 μm to about 12 μm is required to avoid air entrainment between the web material and the additional layers of coating material.

The method of this invention is also effective when more than one coating is to be applied to the web material. Improvement in splice coating uniformity has been seen at second and even third coatings made over a splice treated prior to the first coating.

The following examples will further explain this invention.

EXAMPLE I

A graphic arts photographic film is coated on webs of polyester film base at a speed of 155 meters/minute. Prior to the coating of at least one layer the rolls were spliced together by means of polyester adhesive tape having a total thickness of approximately 0.0025 inches. A felt-tipped marking pen, which produced the required surface roughness, was used to treat approximately 0.5 inches of the top of the splicing tape near the trailing edge in addition to approximately 2 inches of the web surface immediately following the trailing edge of several splices. The splice did not cause non-uniformities in the coating like those seen with an untreated splice. Several subsequent splices were treated in an identical manner with the felt-tipped marker containing ink of virtually identical chemical composition. The additional layer applied with the felt-tipped marker resulted in a surface roughness from at least 5 μm to 12 μm. In this context surface roughness is defined as the difference between the highest and the lowest measured level in the additional applied layer. Having the required surface roughness, the splice did not cause the coating non-uniformities seen even if more than one coating layer was applied.

The application of a more than one layer coating is done by simultaneously applying a multiple layer coating to the web material. The multiple layer coating comprises a bottom coating, typical of films of that type, having a coverage of approximately 38 cc/square meter and a viscosity of 9 cp. In addition to the bottom layer a second and a top layer are provided. The second layer has a coverage of approximately 20 cc/square meter and a viscosity of 20 cp. The top layer has a coverage of approximately 5.25 cc/square meter and a viscosity of 25 cp.

EXAMPLE II

A color print photographic film is coated on webs of acetate film base at a speed of 84 meters/minute. Prior to the coating of at least one layer the rolls were spliced together by means of polyester adhesive tape having a total thickness of approximately 0.0025 inches. A felt-tipped marking pen, which produced the required surface roughness, was used to treat approximately 0.5 inches of the top of the splicing tape near the trailing edge in addition to approximately 2 inches of the web surface immediately following the trailing edge of several splices. The splice did not cause non-uniformities in the coating like those seen with an untreated splice. Several subsequent splices were treated in an identical manner with a felt-tipped marker containing ink of virtually identical chemical composition. The additional layer applied with the felt pen resulted in a surface roughness from at least 5 μm to 12 μm. In this context surface roughness is defined as the difference between the highest and the lowest measured level in the additional applied layer. Having the required surface roughness, the splice did not cause the coating non-uniformities. With the use of the additional layer a sequence of layers can be coated without causing any non-uniformities.

The application of a more than one layer coating is done by simultaneously applying a multiple layer coating to the web material. The multiple layer coating comprises a bottom coating, typical of films of that type, is applied, having a coverage of approximately 42 cc/square meter and a viscosity of 9 cp. In addition to the bottom layer a second and a top layer are provided. The second layer has a coverage of approximately 6.2 cc/square meter and a viscosity of 25 cp. On top of the second layer a third layer is provided. The third layer has a coverage of approximately 24 cc/square meter and a viscosity of 35 cp. The third layer is covered by a top layer. The top layer has a coverage of approximately 6.4 cc/square meter and a viscosity of 24 cp.

The invention has been described in detail with particular reference to certain preferred embodiments thereof, but it will be understood that variations and modifications can be effected within the spirit and scope of the invention

PARTS LIST

| | |
|---|---|
| 2 | preceding web |
| 4 | succeeding web |
| 6 | leading edge |
| 8 | trailing edge |
| 10 | splicing tape |
| 12 | coating |
| 14 | trailing edge of the splicing tape |
| 15 | surface of the succeeding web |
| 16 | coating roller |
| 18 | applicator |
| 20 | region adjacent to the location that the coating |
| 22 | surface area |
| 24 | thin layer |
| 25 | rough surface |
| 26 | layer of air |
| T | transport direction |

What is claimed is:

1. A method for continuous coating a web material having at least one spliced joint, the method comprises the steps of:

providing a preceding web defining a trailing edge and succeeding web defining a leading edge with respect to a transport direction;

applying an additional layer with limited width and a rough surface to the surface of the succeeding web, whereby the layer is in line with the leading edge of the succeeding web;

applying a splicing tape, thereby connecting the said preceding web and said succeeding web and leaving an uncovered surface of the additional layer after the trailing edge of the splicing tape; and applying at least one continuous coating to the surface of the web material.

2. A method as recited in claim 1 wherein the layer encompasses a surface roughness which is generated by an applied and dried liquid and wherein the rough surface has a surface roughness of about 5 $\mu$m to about 12 $\mu$m.

3. A method as recited in claim 1 comprises the step of applying an electrostatic force in an area containing the spliced joint.

4. A method as recited in claim 1 comprises the step of increasing a vacuum level in an area containing the spliced joint.

5. A method as recited in claim 1 wherein the layer after the trailing edge of the splicing tape is provided with a felt-tipped marker.

6. A method as recited in claim 1 wherein the layer after the trailing edge of the splicing tape is provided with a brush.

7. A method as recited in claim 1 wherein the layer after the trailing edge of the splicing tape is provided with spraying means.

* * * * *